No. 743,045. PATENTED NOV. 3, 1903.
H. O. STEARNS.
CROWN DIE FOR FORMING HATS.
APPLICATION FILED JUNE 10, 1903.
NO MODEL.
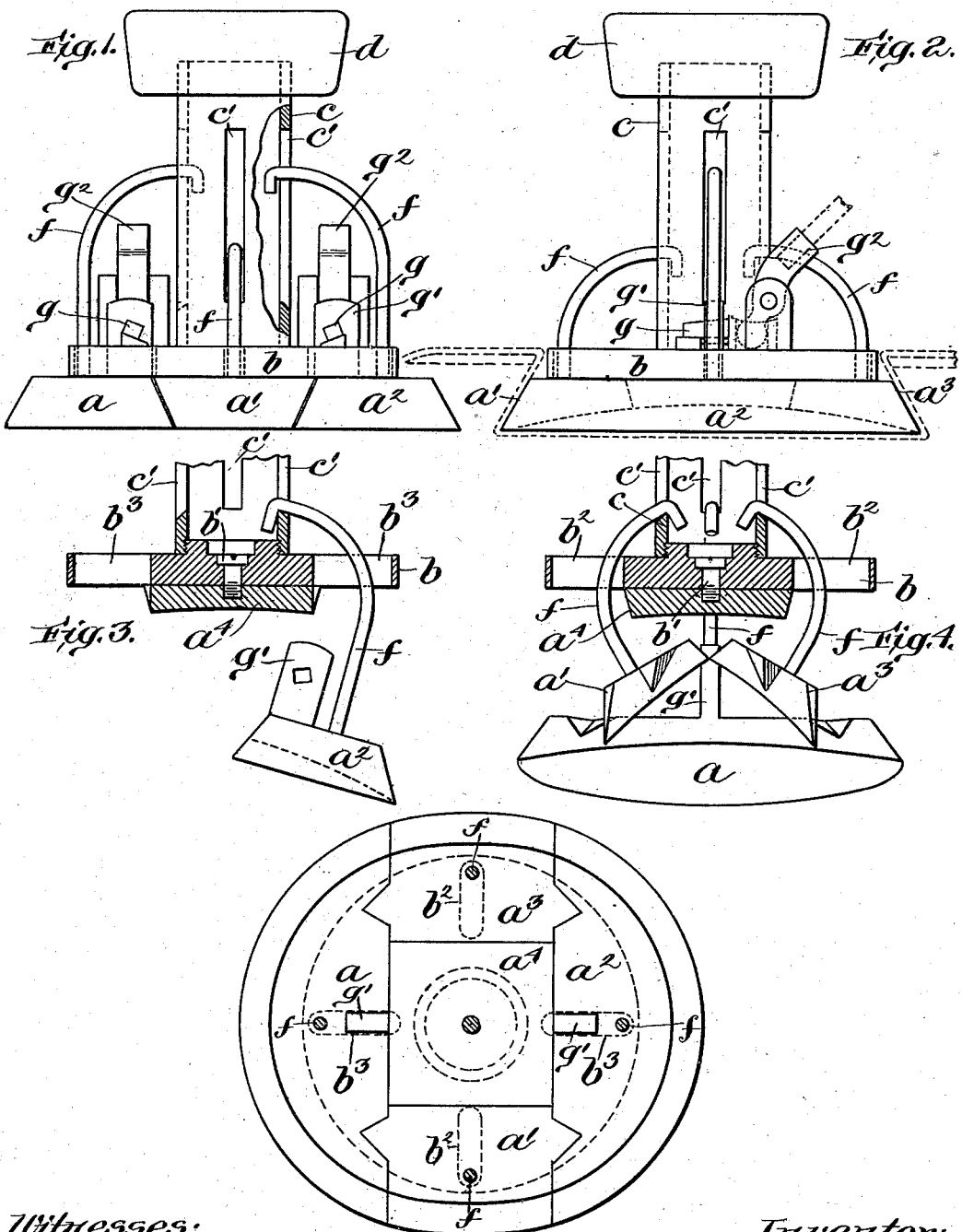

No. 743,045. Patented Novembr 3, 1903.

UNITED STATES PATENT OFFICE.

HENRY O. STEARNS, OF FRAMINGHAM, MASSACHUSETTS, ASSIGNOR TO THOMAS L. BARBER, OF FRAMINGHAM, MASSACHUSETTS.

CROWN-DIE FOR FORMING HATS.

SPECIFICATION forming part of Letters Patent No. 743,045, dated November 3, 1903.

Application filed June 10, 1903. Serial No. 160,860. (No model.)

*To all whom it may concern:*

Be it known that I, HENRY O. STEARNS, of Framingham, in the State of Massachusetts, have invented an Improved Crown-Die for Forming Hats, of which the following is a specification, reference being had to the accompanying drawings.

In forming what are commonly called "body" and "cloth" hats, because made from a "hat-body," so called, the bell-crown is commonly made by means of a male mold in several pieces and a female mold also in several pieces, the hat-body being placed over the male mold, then both inserted in the female mold, which is closed about the body on the male mold, and the bell-crown thus formed under heat and moisture, the crown drying under pressure between the molds. The female mold is then opened, and the formed hat, with the male mold still in it, is taken out and the male mold removed from the crown piece by piece.

The object of my invention is to make a male mold for this use in which the parts of the mold are all connected to one base, and yet these parts will separate in the proper order when pulled out of the bell-crown, as will now be more fully described by reference to the accompanying drawings, in which—

Figure 1 is an elevation of one form of my improved crown-die. Fig. 2 is an elevation of the die shown in Fig. 1, but viewed from another point. Figs. 3 and 4 illustrate the manner in which the segments of the die shown in Figs. 1 and 2 collapse. Fig. 5 is a plan view of the segments, showing them assembled.

The female mold for shaping the outer surface of the bell-crown is and has long been so familiar to all persons skilled in this art as to need no description and is not shown, my invention not relating to it, but solely to means for connecting the parts $a$ $a'$ $a^2$ $a^3$ $a^4$ of the mold to the base $b$, standard $c$, and cap $d$. The center piece $a^4$ is most conveniently secured to base $b$ by a screw $b'$. The movable parts $a$, $a'$ $a^2$ $a^3$ I secure to the base $b$ and standard $c$ by hooks $f$, which extend through slot $b^2$ in base $b$ and whose upper ends play in slots $c'$ in standard $c$. The cap $d$ is of wood or other non-conductor of heat and is most conveniently secured to the top of standard $c$, so that it may be readily removed and replaced in order that screw $b'$ may be unscrewed when a different center piece $a^4$ is to be used. Standard $c$ is a tubular piece of metal secured to base $b$. The locking-bolts $g$ engage hasps $g'$, which are fast on the segments $a$ $a^3$ of the mold, so that when these hasps project through the slots $b^3$ in base $b$ and the bolts $g$ are pressed through the hasps $g'$ all the parts $a$ $a'$ $a^2$ $a^3$ are held firmly in place to make the complete male mold $a$ $a'$ $a^2$ $a^3$ $a^4$.

As the male mold is used hot, I provide socket-levers $g^2$ for moving the locking-bolts $g$ into and out of place in the hasps $g'$.

The operation is as follows: The parts of the male mold being assembled and locked, it is placed on the heater, and when hot enough it is taken by the cap $d$, which being a non-conductor does not get too hot to be handled, and placed at the middle of the hat-body, and the hat-body is turned up about the edge of the male mold, and the body and male mold are then placed together at the middle of the female mold, the parts of which are then brought together about the body and the male mold, as usual, and the plunger of the press brought down on cap $d$, as usual. The operators then manipulate the brim of the body in the well-known manner and thereafter repeat the whole operation on another press, the hat in the first press in the meantime drying and setting. The first press is then opened, and the male mold, with the hat on it, is removed to another bench, the locks unlocked, and the operator lifts the male mold by the cap $d$ out of the hat, the hooks $f$ of the parts $a'$ and $a^3$ first engaging their slots $c'$ in standard $c$ and swinging parts $a'$ $a^3$ together, thereby allowing the parts $a$ and $a^2$ to swing together as soon as their hooks $f$ engage their slots $c'$, as clearly shown in Figs. 3 and 4.

This apparatus is wholly new with me, so far as I have any reason to believe, and its main advantages are a material saving in the time of the operators, and consequent increase in product, and a complete prevention of injury to the corners and edges of the segments $a$ $a'$ $a^2$ $a^3$, which in the apparatus heretofore known frequently fall and become defaced.

What I claim as my invention is—

1. The male mold for shaping hats above described comprising segments which together make up the male mold proper, a base, and means for connecting the segments and the base with the segments in either one of two positions relatively to the base.

2. In combination in a male mold for shaping hats, the slotted base, the standard fast to the base, the segments together constituting the male mold proper; and hooks, one for each of the four segments, which hooks extend each through its slot in the base and each coöperates with its slot in the standard, all substantially as described.

3. In combination in a male mold for shaping hats, the slotted base, the standard fast to the base, the segments together constituting the male mold proper; and hooks, one for each of the four segments, which hooks extend each through its slot in the base, and each coöperates with its slot in the standard; and means for locking the base to the segments, all substantially as described.

HENRY O. STEARNS.

Witnesses:
G. A. ROCKWELL,
C. B. MAYNADIER.